(12) United States Patent
Harms et al.

(10) Patent No.: US 6,430,169 B1
(45) Date of Patent: Aug. 6, 2002

(54) SPECTRAL SHAPING A CDMA SIGNAL

(75) Inventors: Brian K. Harms, Boulder; Anthony C. K. Soong, Superior; Thomas J. Funk, Lafayette; Larry D. Flowers, Broomfield, all of CO (US)

(73) Assignee: Qualcomm Incorporated, San Diego, CA (US)

( * ) Notice: Subject to any disclaimer, the term of this patent is extended or adjusted under 35 U.S.C. 154(b) by 0 days.

(21) Appl. No.: 09/265,202

(22) Filed: Mar. 10, 1999

(51) Int. Cl.[7] .......................... H04B 7/216; H04J 13/02
(52) U.S. Cl. .................. 370/335; 370/342; 375/146; 375/297; 455/450
(58) Field of Search .................. 370/328, 329, 370/335, 342; 375/130, 140, 141, 146, 295, 296, 297, 302, 303, 304, 344, 346, 350; 455/118, 119, 422, 450

(56) References Cited

U.S. PATENT DOCUMENTS

| | | | | |
|---|---|---|---|---|
| 5,107,487 A | * | 4/1992 | Vilmur et al. ................. 370/18 |
| 5,140,610 A | * | 8/1992 | Holliday et al. ................ 375/1 |
| 5,280,499 A | * | 1/1994 | Suzuki ........................... 375/1 |
| 5,432,814 A | * | 7/1995 | Hasegawa .................... 375/202 |
| 5,613,191 A | * | 3/1997 | Hylton et al. ................. 455/3.1 |
| 5,918,166 A | * | 6/1999 | Tsumura ................... 455/249.1 |
| 5,978,362 A | * | 11/1999 | Lee et al. .................... 370/315 |

FOREIGN PATENT DOCUMENTS

WO    WO 98/10543    * 3/1998

* cited by examiner

Primary Examiner—Alpus H. Hsu
(74) Attorney, Agent, or Firm—Russell B. Miller; Christopher O. Edwards (57) ABSTRACT

The invention is a CDMA spectral shaping technology that attenuates the out-of-band signal power in the CDMA signal. The in-band CDMA signal is attenuated near the corner frequencies to reduce components that provide a disproportionate contribution to the out-of-band signal power. The power amplifier in the CDMA base station can then operate at higher power levels without exceeding out-of-band signal power limitations. As a result, the power amplifier operates more efficiently and extends the range or capacity of the base station. In some examples of the invention, spectral shaping digital filters are placed between the cell site modem and the digital-to-analog converter in the base station. In other examples of the invention, spectral shaping analog filters are placed between the digital-to-analog converter and the low-pass filter in the base station.

13 Claims, 7 Drawing Sheets

SPECTRAL SHAPING A CDMA SIGNAL

BACKGROUND OF THE INVENTION

I. Field of the Invention

The present invention relates to Code Division Multiple Access (CDMA) systems. More particularly, the present invention includes, but is not limited to, a novel and improved CDMA base station that shapes the frequency spectrum of CDMA signals to reduce out-of-band signal emissions.

II. Description of the Related Art

Code Division Multiple Access (CDMA) technology is commonly used in communications systems. In a typical CDMA system, a CDMA base station transmits a CDMA signal to numerous CDMA communications devices, such as wireless telephones. The CDMA signal is comprised of numerous individual user signals. The CDMA base station generates the CDMA signal by encoding each individual user signal with a unique spreading sequence, such as a pseudo random sequence. The CDMA base station then adds the encoded user signals together to form the CDMA signal.

In a CDMA system, individual user signals are not separated based on frequency or time, but are spread across the entire frequency band. Each CDMA communications device derives its particular user signal based on the unique spreading sequence. Due to this combination of multiple signals encoded with random sequences, the CDMA signal has random signal peaks that cause problems when the CDMA signal is amplified.

The CDMA base station uses a power amplifier to amplify the CDMA signal. The power amplifier contributes unwanted noise when operated above a maximum power level. Unfortunately, the random peaks in the CDMA signal force the power amplifier to operate above this maximum power level. In contrast, the typical Frequency Modulated (FM) signal does not have random signal peaks, so the power amplifier is able to continuously operate below the maximum power level.

The power amplifier contributes noise in the form of signal power outside of the frequency band of the CDMA signal. This signal power is referred to as out-of-band signal power. Out-of-band signal power is a problem because it interferes with other signals in the neighboring frequency bands. These other signals are disrupted by the interference. Government agencies, such as the Federal Communications Commission in the United States, strictly regulate the interference caused by out-of-band signal power.

The existing solution to this problem is to operate the power amplifier in the CDMA base station below its maximum power level. This reduces the amount of out-of-band signal power caused by the random peaks in the CDMA signal. This solution is lacking because the power and range of the base station is reduced. In addition, the power amplifier may operate less efficiently below the maximum power level.

CDMA systems would be improved by techniques to reduce the noise contribution of the power amplifier in the base station. The noise reduction would directly increase the power and efficiency of the CDMA base station.

SUMMARY OF THE INVENTION

The above-described problem is solved with CDMA spectral shaping technology that reduces the out-of-band signal power in the CDMA signal. The in-band CDMA signal is attenuated near the corner frequencies to reduce components that provide a disproportionate contribution to the out-of-band signal power. The power amplifier in the CDMA base station can then operate at higher power levels without exceeding out-of-band signal power limitations. As a result, the power amplifier operates more efficiently and extends the range or capacity of the base station. This improvement is passed on to the wireless communications user in the form of higher quality and lower cost.

In some examples of the invention, the corner filters are digital elements that are placed between the cell site modem and the digital-to-analog converter in the base station. In other examples of the invention, the corner filters are analog elements that are placed between the digital-to-analog converter and the low-pass filter in the base station.

BRIEF DESCRIPTION OF THE DRAWINGS

The features, objects, and advantages of the present invention will become more apparent from the detailed description set forth below when taken in conjunction with the drawings in which like reference characters identify correspondingly throughout and wherein.

DETAILED DESCRIPTION OF THE PREFERRED EMBODIMENTS

Figure 1:
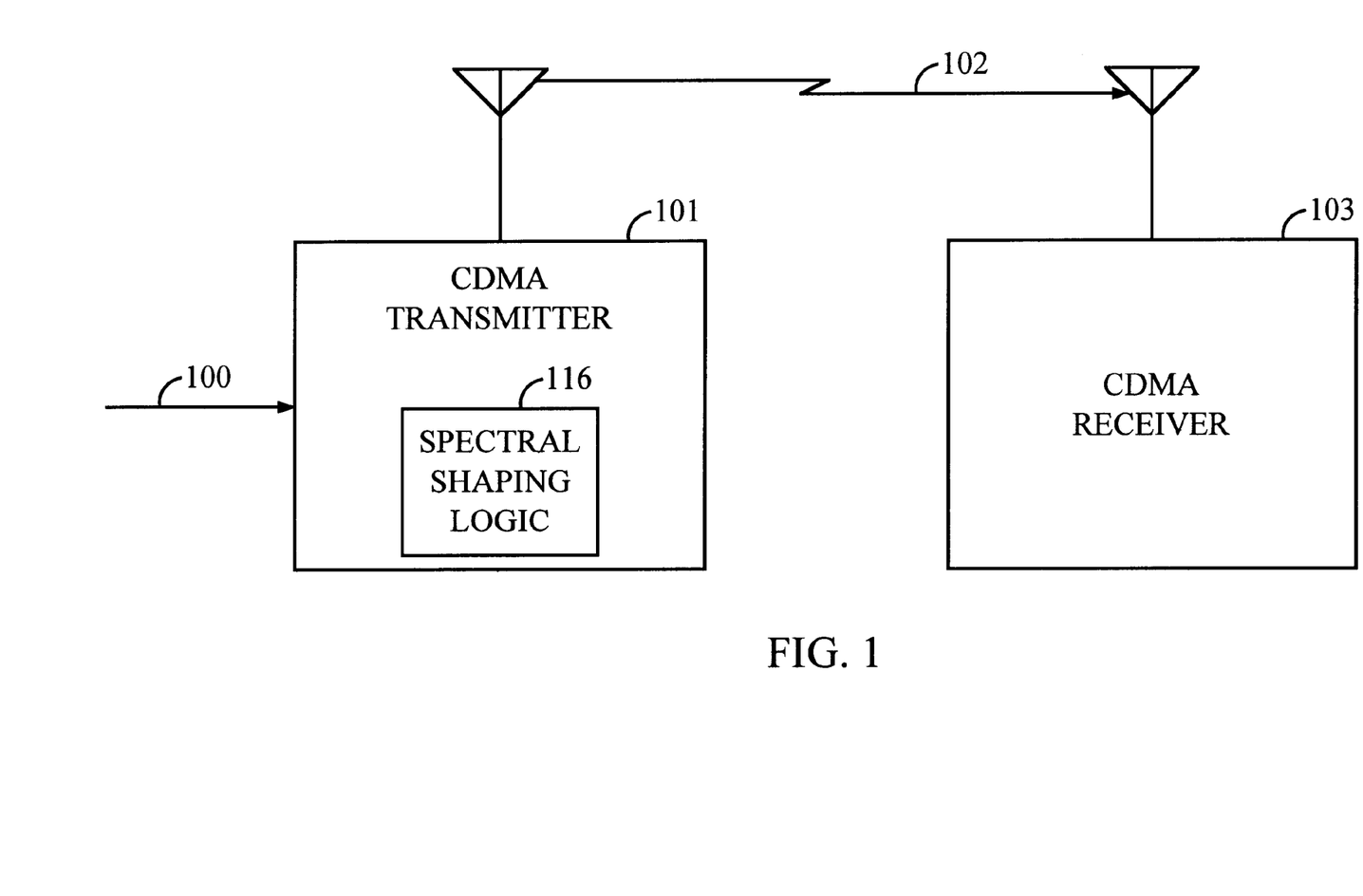
FIG. 1 is a block diagram of a CDMA system with spectral shaping logic.
Figure 2:
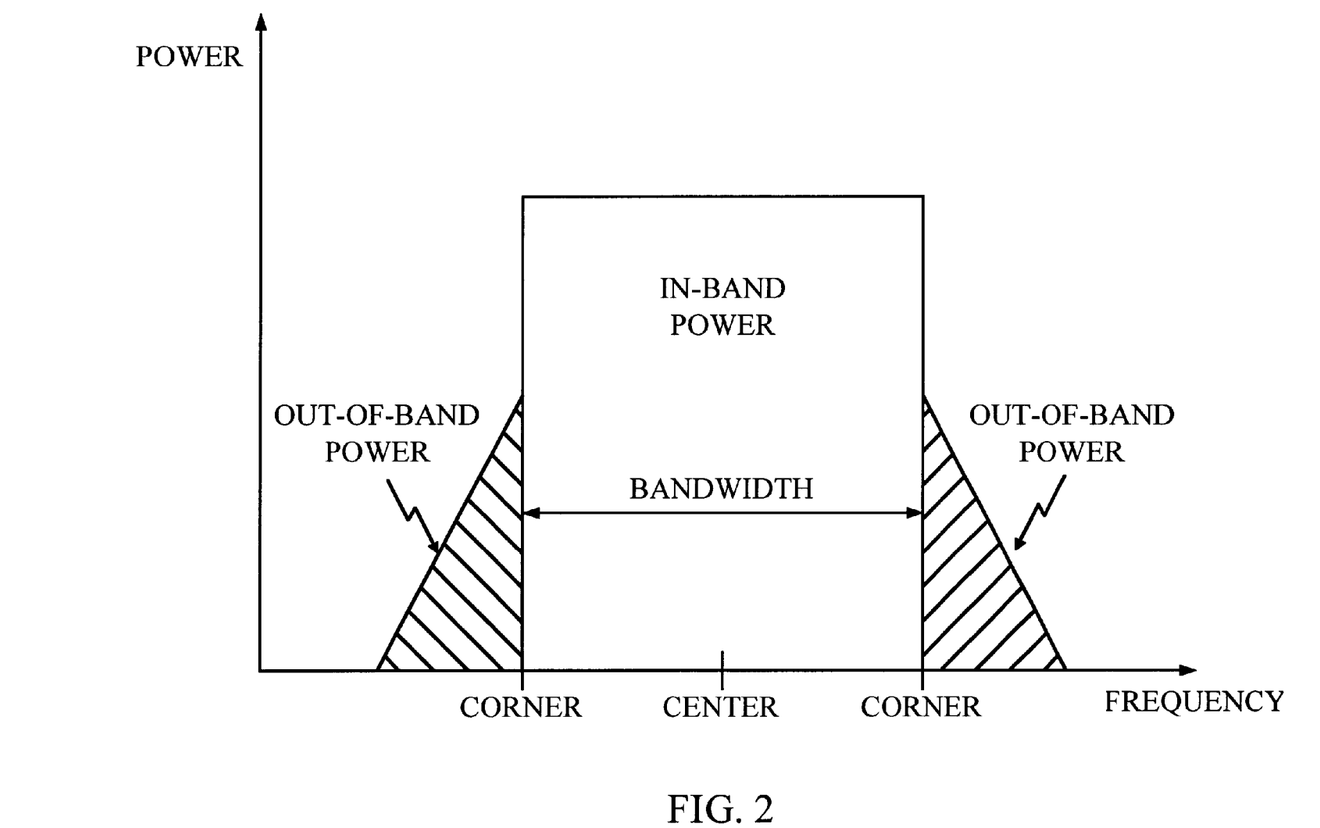
FIG. 2 is a graph illustrating the frequency spectrum of a CDMA signal without spectral shaping.
Figure 3:
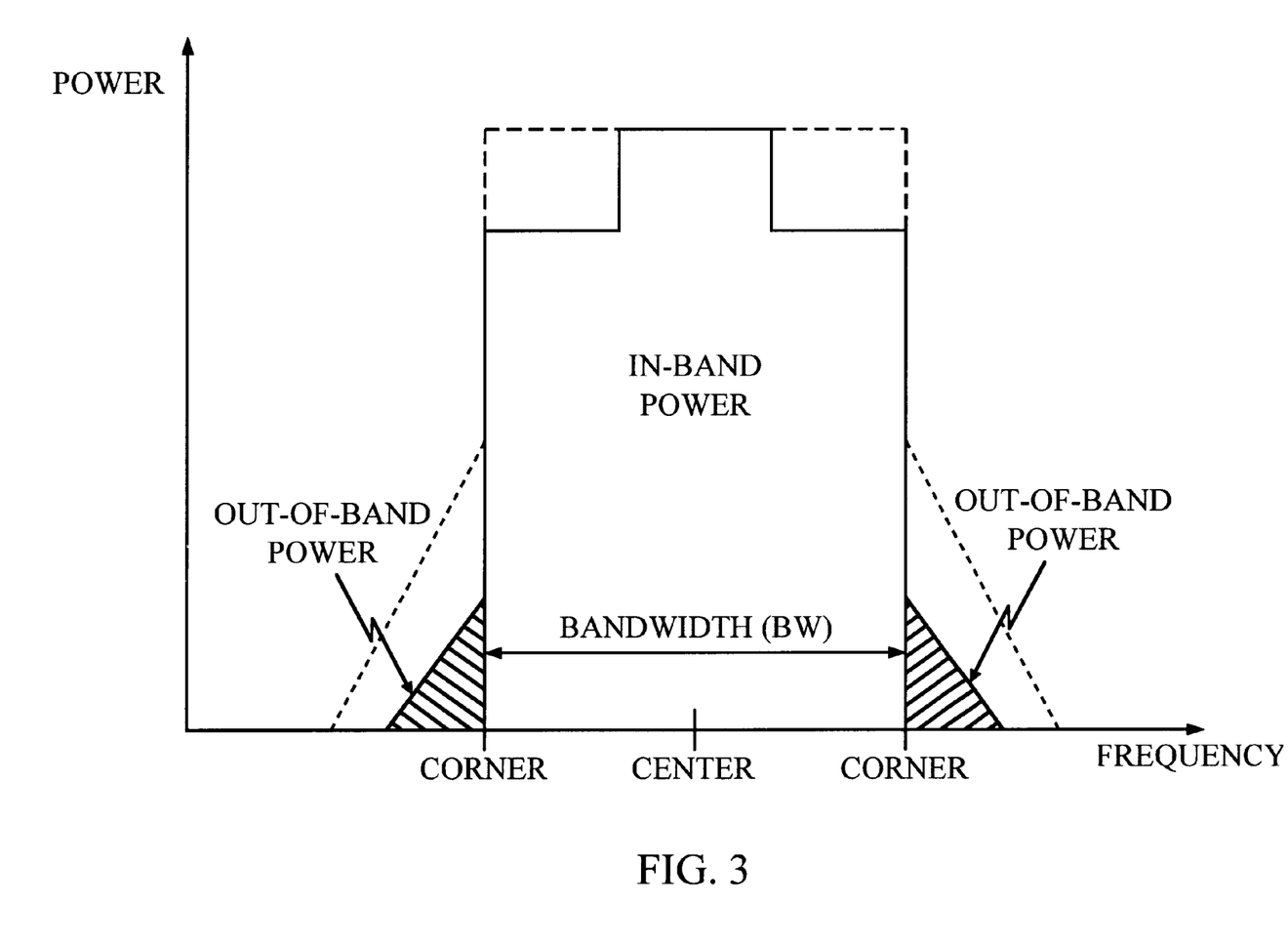
FIG. 3 is a graph illustrating the frequency spectrum of a CDMA signal with spectral shaping.

Spectral Shaping—FIGS. 1–3

FIG. 1 depicts a baseband CDMA signal 100, a CDMA transmitter 101, an RF CDMA signal 102, and a CDMA receiver 103. CDMA is a spread-spectrum communications technology. Some versions of CDMA are specified by standards, such as IS-95 approved by the Telecommunications Industry Association. The CDMA signal 100 could be any CDMA signal, such as the signal produced by a cell site modem in a CDMA base station. The CDMA receiver 103 could be any CDMA device capable of receiving a CDMA signal, such as a wireless CDMA telephone.

The CDMA transmitter 101 could be any CDMA transmission device that includes spectral shaping logic 116 to attenuate in-band portions of the CDMA signal 100 adjacent to the corner frequencies. The CDMA transmitter 101 typically amplifies the shaped CDMA signal and transmits the amplified CDMA signal 102 to the CDMA receiver 103. One example of the CDMA transmitter 101 is a CDMA base station.

In operation, the spectral shaping logic 116 in the CDMA transmitter 101 shapes the CDMA signal 100 to form CDMA signal 102. To shape the CDMA signal 100, the spectral shaping logic 115 attenuates in-band portions of the signal near the corner frequencies. The attenuation reduces the out-of-band noise caused by amplification of the CDMA signal. The attenuation should not be allowed to degrade the CDMA signal 102 to an unacceptable level. The CDMA transmitter 101 transmits the shaped CDMA signal 102 to the CDMA receiver 103 over the air interface. Although the invention is depicted using an air interface, other transmission media could also be used, such as RF cable, power lines, or telephone lines.

FIG. 2 illustrates the frequency spectrum of a CDMA signal that has been amplified without spectral shaping. The vertical axis represents signal power, and the horizontal axis represents frequency. The desired in-band signal power is contained within the bandwidth defined by corner frequencies around a center frequency. A typical example is a 1.25 MHz bandwidth centered about a 1.96 GHz center frequency with corner frequencies at (1.96 GHz–625 KHz) and (1.96 GHz+625 KHz). The signal power drops significantly outside of the bandwidth, but some undesired out-of-band signal power is still present and is shaded on FIG. 2. Out-of band signal power is undesirable because it represents wasted power that interferes with other signals in neighboring frequency bands.

A power amplifier is typically used to amplify CDMA signals. The output of the power amplifier in the time domain can be mathematically modeled as:

$$y(t) = \sum_{n=0}^{N} K_n [x(t)]^n = K_0 + K_1 x(t) + K_2 x^2(t) + K_3 x^3(t) \ldots \quad (1)$$

where x(t) is the input to the power amplifier. If this model is transformed from the time domain to the frequency domain, the mathematical representation is:

$$Y(f) = K_0 + K_1 X(f) + K_2 (X(f) * X(f)) + K_3 (X(f) * X(f) * X(f)) \quad (2)$$

where Y(f) is the Fourier transform of y(t) and the symbol "*" denotes convolution. In the context of the invention, the even terms do not contribute significant power to the in-band signal.

Application of the well-known graphical technique for computing the convolution of $X(f)*X(f)*X(f)$ reveals that in-band signal power that is input near the corner frequencies makes a disproportionate contribution to the un-wanted out-of-band signal power that is output from the power amplifier. A reduction of in-band signal power that is input near the corner frequencies causes a disproportionate reduction in the unwanted out-of-band signal power that is output by the power amplifier. The reduction of in-band signal power does degrade the CDMA signal, but the degradation is acceptable given the disproportionate reduction in the out-of-band signal power.

FIG. 3 illustrates the frequency spectrum of a CDMA signal that has been amplified after being shaped by spectral shaping logic 116. The vertical axis represents signal power, and the horizontal axis represents frequency. The desired in-band signal power is contained within the bandwidth defined by corner frequencies around a center frequency. The undesired out-of-band signal power is shaded on FIG. 3. The dashed lines on FIG. 3 represent the CDMA signal from FIG. 2 that was not shaped by spectral shaping logic 116. The dashed lines illustrate that attenuation of the in-band signal power near the corner frequencies produces a reduction in the undesired out-of-band signal power.

Figure 4:
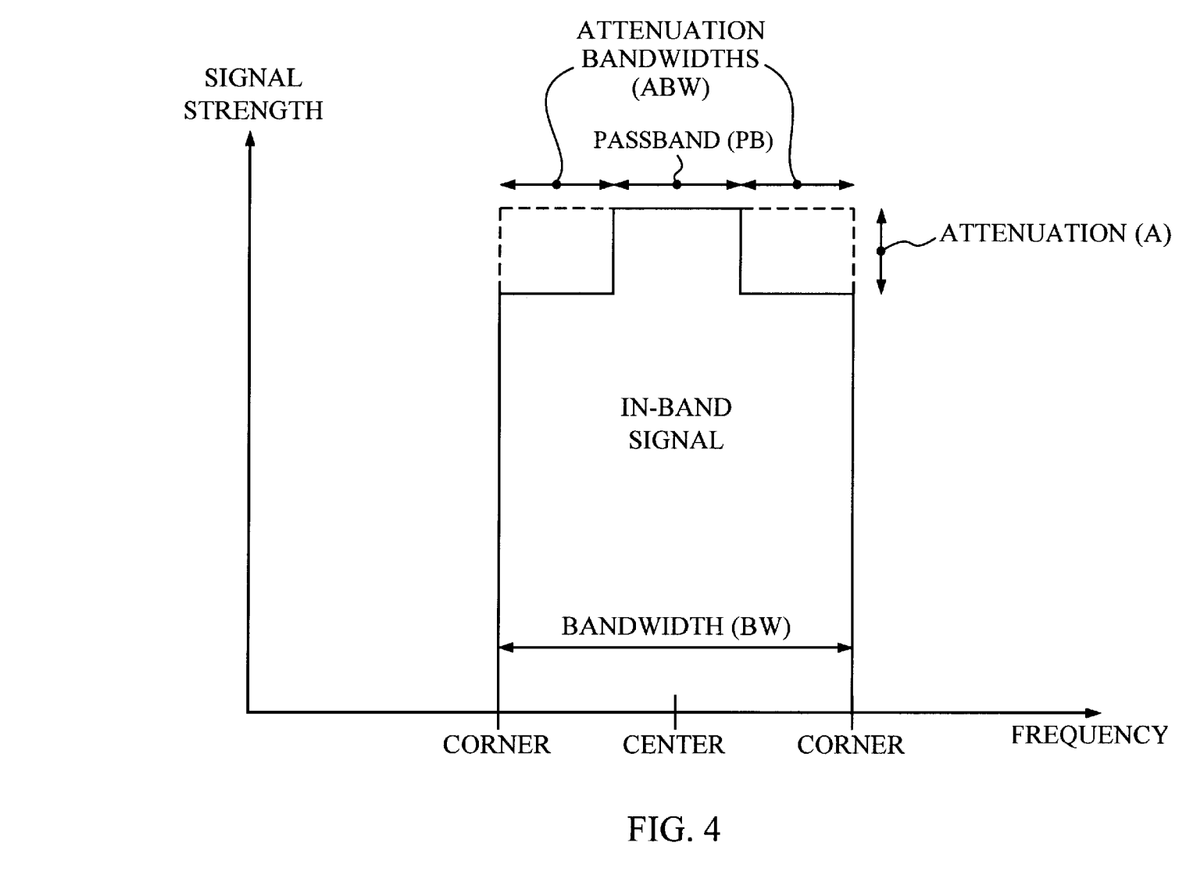
FIG. 4 is a graph illustrating the characteristics of the spectral shaping logic.

FIG. 4 depicts characteristics of the spectral shaping logic 116. Those skilled in the art recognize that FIG. 4 represents ideal characteristics, but will recognize how to configure spectral shaping logic 116 based on the ideal characteristics of FIG. 4. The vertical axis represents signal strength, and the horizontal axis represents frequency. The dashed lines represent the CDMA signal before spectral shaping by the spectral shaping logic 116.

The spectral shaping logic 116 could be comprised of a digital or analog band-pass filter with the following characteristics. The bandpass filter would attenuate the signal strength in the attenuation bandwidths (ABW) by attenuation (A), and pass the signal strength within the passband (PB). The attenuation bandwidths ABW are adjacent to the corner frequencies and in-band, so they are within the CDMA signal bandwidth (BW). In some embodiments, the attenuation bandwidths (ABW) could each be 4.5% of the signal bandwidth BW. Alternatively, the passband PB could be 91% of the signal bandwidth BW and centered on the center frequency. The attenuation A could be 3 decibels. Alternatively, the spectral shaping can be implemented via baseband filtering prior to up-conversion.

Figure 5:
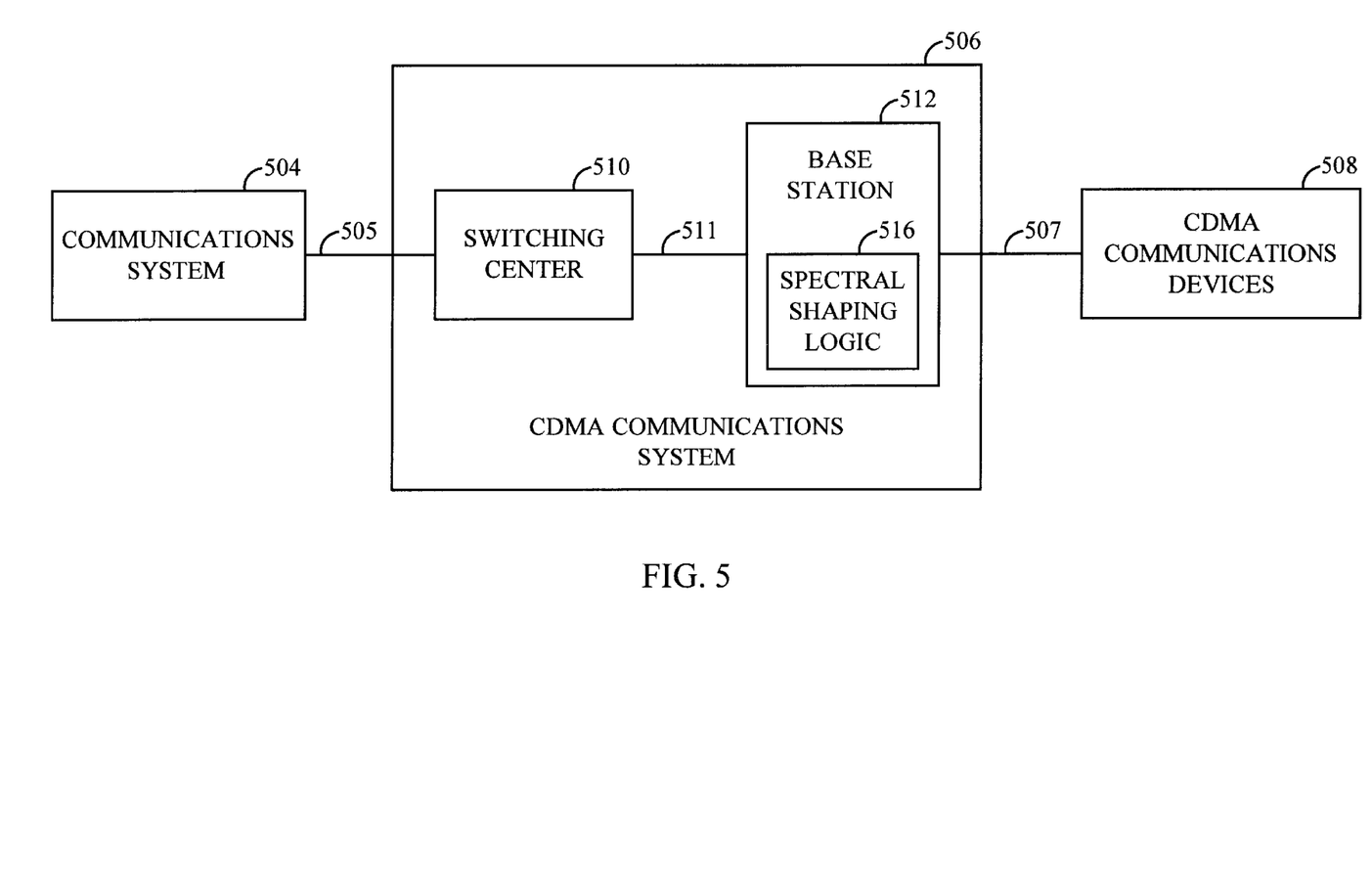
FIG. 5 is a block diagram of a CDMA system with spectral shaping logic.
Figure 6:
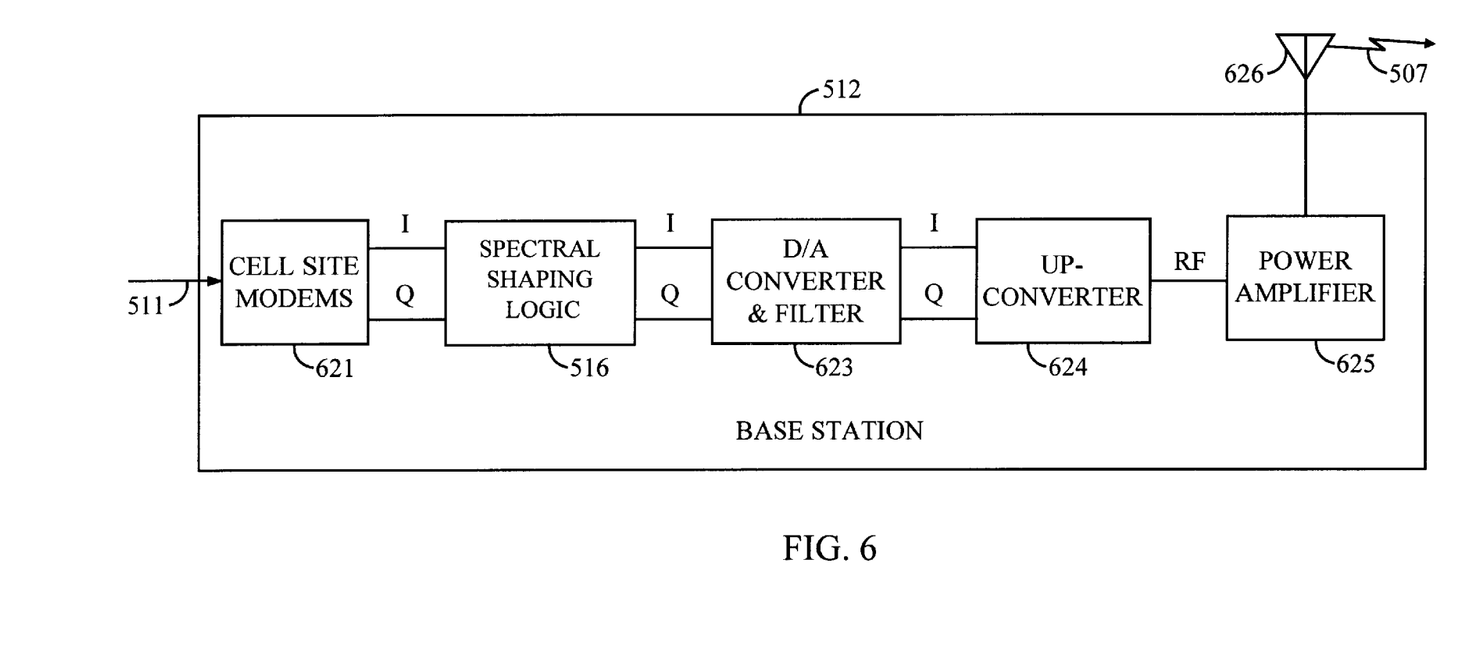
FIG. 6 is a block diagram of a CDMA base station with spectral shaping logic.

CDMA Spectral Shaping System—FIGS. 5–6

FIGS. 5–6 depict a specific example of a CDMA system that uses spectral shaping, but those skilled in the art will recognize numerous other types of CDMA systems that are applicable to the spectral shaping invention described above. FIG. 5 depicts a communications system 504 that is connected to the CDMA communications system 506. The CDMA communications system 506 communicates with CDMA communications devices 508. The CDMA communications system 506 is comprised of a switching center 510 and a base station 512. The communications system 504 exchanges communications signals 505 with the switching center 510. The switching center 510 exchanges communications signals 511 with the base station 512. The base station 512 exchanges wireless CDMA communications signals 507 over the air interface with the CDMA communications devices 508.

The communications system 504 could be any communications system capable of exchanging communications signals 505 with the CDMA communications system 506. The communications system 504 is typically a conventional public telephone network, but could also be many other networks, such as a local area network, wide area network, or internet.

The switching center 510 could be any device that provides an interface between the base station 512 and the communications system 504. Typically, numerous base stations are connected to the communications system 504 through the switching center 510, but the number of base stations has been restricted for the purpose of clarity.

The base station 512 exchanges wireless CDMA signals 507 with the CDMA communications devices 508. The base station 512 includes spectral shaping logic 516 that attenuates the in-band portion of the CDMA signal near the corner frequencies before amplification and transmission to the CDMA communications devices 508. Typically, numerous CDMA communications devices exchange signals with the base station 512, but the number of communications devices has been restricted for the purpose of clarity. Those skilled in the art could adapt the base station 512 from known systems, such as the base stations provided by Qualcomnm, Inc. of San Diego, Calif.

The CDMA communications devices 508 exchange wireless CDMA signals 507 with the base station 512. The typical CDMA communications device is a mobile telephone, but other CDMA communications devices are also possible, such as fixed wireless devices, data terminals, set-top boxes, or computers.

In operation, the CDMA communications devices 508 communicate through the CDMA communications system 506 with the communications system 504 or with each other. On the communications path from the communications system 504 to the CDMA communications devices 508, the spectral shaping logic 516 attenuates the in-band portion of the CDMA signal near the corner frequencies. The spectral shaping allows the base station 512 to operate more efficiently and with a greater range or capacity.

FIG. 6 depicts the base station 512 of FIG. 5 receiving the communications signals 511 and transmitting the CDMA communications signals 507. The base station 512 is comprised of the following elements connected in series: cell site modems 621, spectral shaping logic 516, digital-to-analog conversion and filter 623, up-converter 624, power amplifier 625, and antenna 626. Aside from the spectral shaping logic 516, those skilled in the art are familiar with these elements and their operation.

The cell site modems 621 produce a CDMA signal comprised of quadrature signals I and Q. Quadrature CDMA signals I and Q are well-known and are the baseband signals to be transmitted using carriers of the same frequency, but in phase quadrature. In other words, the RF CDMA signal can be constructed by modulating I by cosine (2×pi×frequency× time) and by modulating Q by sine (2×pi×frequency×time). In IS-95A for example, quadrature signals carry the same data with different pseudo-random sequence codes. The cell site modems 621 may apply forward error correction coding before transferring the quadrature signals I and Q to the spectral shaping logic 516.

The spectral shaping logic 516 are comprised of digital filters that attenuate the strength of the in-band quadrature signals I and Q near the corner frequencies as depicted in FIG. 4. The spectral shaping logic 516 provides the shaped I and Q signals to the digital-to-analog conversion and filter 623.

The digital-to-analog conversion and filter 623 converts the shaped I and Q signals to analog and filters out components outside of the desired bandwidth. The digital-to-analog conversion and filter 623 provides the I and Q signals to the up-converter 624. The up-converter 624 modulates the I and Q signals with intermediate and radio frequencies to form a Radio Frequency (RF) CDMA signal. The power amplifier 625 amplifies the RF CDMA signal. Because of spectral shaping, the power amplifier 625 operates at a higher and more efficient power level without generating intolerable amounts of out-of-band signal power. The antenna 626 transmits the amplified RF CDMA signal 507.

Figure 7:
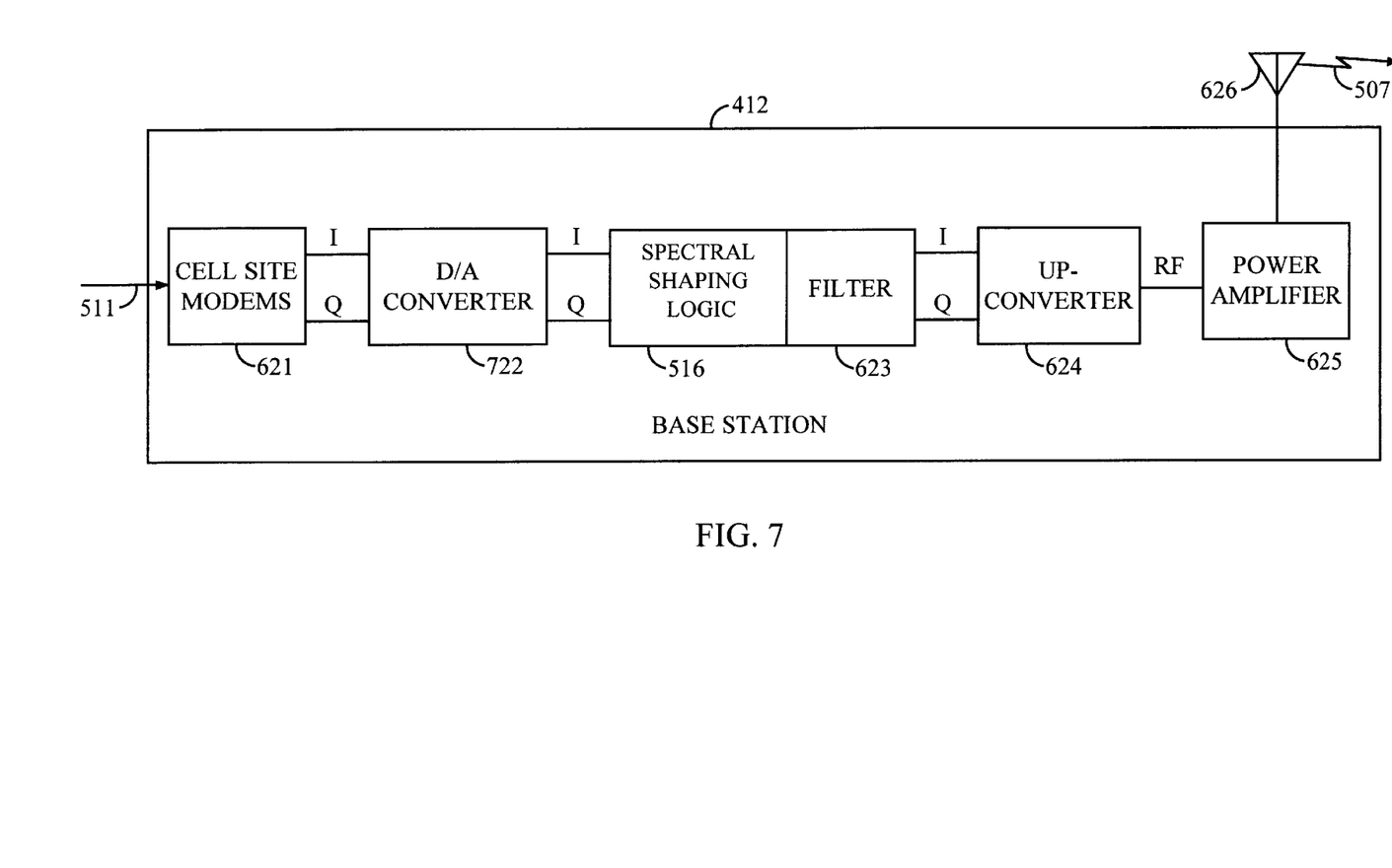
FIG. 7 is a block diagram of a CDMA base station with spectral shaping logic.

Alternative CDMA System—FIG. 7

FIG. 7 depicts an alternative version of the base station 512 of FIG. 5. The base station 512 receives the communications signals 511 and transmits the CDMA communications signals 507. The base station 512 is comprised of the following elements connected in series: cell site modems 621, digital-to-analog conversion 722, spectral shaping logic 516, filter 623, up-converter 624, power amplifier 625, and antenna 626. Aside from the spectral shaping logic 516, those skilled in the art are familiar with these elements and their operation.

The cell site modems 621 produce a CDMA signal comprised of quadrature signals I and Q, and provide the I and Q signals to the digital to analog conversion 722. The digital-to-analog conversion 722 converts the I and Q signals to analog and provides the analog I and Q signals to the spectral shaping logic 516.

The spectral shaping logic 516 is comprised of analog filters that attenuate the strength of the in-band quadrature signals I and Q near the corner frequencies as depicted in FIG. 4. The spectral shaping logic 516 provide the shaped I and Q signals to the filter 623. The filter 623 filters out components outside of the desired bandwidth. The spectral shaping logic 516 and the filter 623 are shown together because it may be desirable in this version of the invention to integrate the spectral shaping logic 516 and the filter 623 into a single analog filter component combining the characteristics of the two. The filter 623 provides the I and Q signals to the up-converter 624.

The up-converter 624 modulates the I and Q signals with intermediate and radio frequencies to form a Radio Frequency (RF) CDMA signal. The power amplifier 625 amplifies the RF CDMA signal. Because of special shaping, the power amplifier 625 operates at a higher and more efficient power level without generating intolerable amounts of out-of-band signal power. The antenna 626 transmits the amplified RF CDMA signal 507.

The previous description of the preferred embodiments is provided to enable any person skilled in the art to make or use the present invention. The various modifications to these embodiments will be readily apparent to those skilled in the art, and the generic principles defined herein may be applied to other embodiments without the use of the inventive faculty. Thus, the present invention is not intended to be limited to the embodiments shown herein but is to be accorded the widest scope consistent with the principles and novel features disclosed herein.

We claim:

1. A method for processing a Code Division Multiple Access (CDMA) signal, the method comprising:

processing a digital representation of a voice encoded signal into a direct sequence CDMA signal;

attenuating the CDMA signal at in-band frequencies adjacent to a first corner frequency and adjacent to a second corner frequency to generate a shaped CDMA signal, wherein the corner frequencies define a bandwidth for the CDMA signal;

minimizing random out-of-band signal peaks; and amplifying the shaped CDMA signal to generate an amplified CDMA signal.

2. The method of claim 1 further comprising generating the CDMA signal.

3. The method of claim 2 further comprising transmitting the amplified CDMA signal.

4. The method of claim 1 wherein attenuating comprises digital filtering.

5. The method of claim 1 wherein attenuating comprises analog filtering.

6. The method of claim 1 comprising passing the CDMA signal at in-band frequencies within a passband that is shorter than the bandwidth.

7. The method of claim 1 wherein the method is performed by a CDMA base station.

8. A method for processing a Code Division Multiple Access (CDMA) signal, the method comprising:

processing a digital representation of a voice encoded signal into a direct sequence CDMA signal;

providing the CDMA signal to spectral shaping logic to generate a shaped CDMA signal, wherein the spectral shaping logic is configured to attenuate the CDMA signal at in-band frequencies outside of a passband that includes a center frequency for the CDMA signal and that is shorter than a bandwidth for the CDMA signal;

minimizing random out-of-band signal peaks; and amplifying the shaped CDMA signal.

9. The method of claim 8 further comprising generating the CDMA signal.

10. The method of claim 9 further comprising transmitting the amplified CDMA signal.

11. The method of claim 8 wherein the spectral shaping logic comprises a digital filter.

12. The method of claim 8 wherein the spectral shaping logic comprises an analog filter.

13. The method of claim 8 wherein the method is performed by a CDMA base station.

* * * * *